United States Patent
Kelford et al.

(10) Patent No.: US 10,024,270 B2
(45) Date of Patent: Jul. 17, 2018

(54) VIBRATION DAMPING DRAG LINK FITTING FOR A THRUST REVERSER

(71) Applicant: Rohr, Inc., Chula Vista, CA (US)

(72) Inventors: Bryce Tyler Kelford, San Diego, CA (US); Bryan S. Holt, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 297 days.

(21) Appl. No.: 14/882,076

(22) Filed: Oct. 13, 2015

(65) Prior Publication Data
US 2017/0101962 A1    Apr. 13, 2017

(51) Int. Cl.
*F02K 1/54*      (2006.01)
*B64D 33/04*    (2006.01)
*F02K 1/72*      (2006.01)

(52) U.S. Cl.
CPC .............. *F02K 1/54* (2013.01); *B64D 33/04* (2013.01); *F02K 1/72* (2013.01); *F05D 2260/50* (2013.01); *F05D 2260/96* (2013.01)

(58) Field of Classification Search
CPC . F02K 1/72; F02K 1/763; F02K 1/766; F02K 3/06; F02K 1/70; F02K 1/64; F02K 1/80; B64D 33/04; F05D 2260/96; F05D 2260/50
See application file for complete search history.

(56) References Cited

U.S. PATENT DOCUMENTS

| | | | | |
|---|---|---|---|---|
| 3,262,271 A | * | 7/1966 | Beavers | B64C 25/423 239/265.19 |
| 3,626,566 A | * | 12/1971 | Kilgour | F16C 11/0614 29/441.1 |
| 4,278,220 A | * | 7/1981 | Johnston | F02K 1/72 244/110 B |
| 4,391,409 A | * | 7/1983 | Scholz | F02K 1/72 239/265.29 |
| 4,605,186 A | * | 8/1986 | Fernz | B64D 33/04 239/265.39 |
| 4,909,442 A | * | 3/1990 | Fernz | F02K 1/72 239/265.29 |
| 8,109,467 B2 | * | 2/2012 | Murphy | F02K 1/72 244/110 B |

(Continued)

OTHER PUBLICATIONS

EP Application No. 16193589.5 Extended European Search Report, dated Mar. 8, 2017, 7 pages.

*Primary Examiner* — Assres H Woldermaryam
(74) *Attorney, Agent, or Firm* — Cantor Colburn LLP (57) ABSTRACT

A nacelle drag-link assembly for a thrust reverser of a propulsion system includes a drag-link fitting, a drag link, a coupling assembly, and a vibration damping assembly. The drag-link fitting includes a base region and a coupling socket extending from the base region. The coupling socket has a first coupling aperture and a second coupling aperture. The drag link includes an inner structure end, an outer structure end, and a link body. The outer structure end includes a pivot area to link with a blocker door of the thrust reverser. A coupling assembly is installed through an aperture of the inner structure end and between the first coupling aperture and the second coupling aperture of the coupling socket. The vibration damping assembly is installed in contact with the drag-link fitting and one or more of: the drag link and the coupling assembly.

13 Claims, 8 Drawing Sheets

(56) References Cited

U.S. PATENT DOCUMENTS

| | | | |
|---|---|---|---|
| 8,127,532 B2* | 3/2012 | Howe | F02K 1/1207 60/226.3 |
| 8,677,732 B2* | 3/2014 | Vauchel | F02K 1/72 60/226.1 |
| 8,959,889 B2* | 2/2015 | Howe | A63F 13/12 239/265.19 |
| 9,322,360 B2* | 4/2016 | James | F02K 1/62 |
| 2004/0068978 A1* | 4/2004 | Lair | F02K 1/70 60/226.2 |
| 2012/0006000 A1 | 1/2012 | Vauchel et al. | |

* cited by examiner

VIBRATION DAMPING DRAG LINK FITTING FOR A THRUST REVERSER

BACKGROUND

The present disclosure generally relates to aircraft propulsion systems, and more particularly, to a drag-link assembly for an aircraft engine thrust reverser.

Recent trends in aviation engineering have led to the pursuit of higher bypass ratio engine designs in order to improve the engine thrust specific fuel consumption (TSFC) and thereby overall system efficiency. Very High Bypass Ratio (VHBR) engines are being pursued to increase propulsive efficiencies. In large engines, VHBR results in large fans and associated fan ducts to accommodate the increased fan airflow. However, these VHBR engines require the nacelle surfaces to be minimized to obtain acceptable airframe integration losses. A cascade-style thrust reverser used in such an engine typically requires the use of very slender drag links that support movement of blocker doors. The drag links may be susceptible to fatigue failure due to induced vibrations from flutter or from engine vibrations.

BRIEF DESCRIPTION

According to a non-limiting embodiment, a nacelle drag-link assembly for a thrust reverser of a propulsion system includes a drag-link fitting, a drag link, a coupling assembly, and a vibration damping assembly. The drag-link fitting includes a base region and a coupling socket extending from the base region. The coupling socket has a first coupling aperture and a second coupling aperture. The drag link includes an inner structure end, an outer structure end, and a link body formed between the inner structure end and the outer structure end. An inner width of the coupling socket is greater than an outer width of the inner structure end of the drag link. The outer structure end includes a pivot area to link with a blocker door of the thrust reverser. A coupling assembly is installed through an aperture of the inner structure end and between the first coupling aperture and the second coupling aperture of the coupling socket. The vibration damping assembly is installed in contact with the drag-link fitting and one or more of: the drag link and the coupling assembly.

According to another non-limiting embodiment, a method of damping vibrations in a drag link includes pivotally coupling the drag link at a first end to a movable blocker door of a thrust reverser, and pivotally coupling a second end of the drag link opposite the first end to a drag link fitting attached to an inner fixed structure that surrounds a propulsion engine. A load path is established between the drag link and the drag link fitting that includes therein a compliant, vibration damping component to damp vibrations between the drag link fitting and the drag link.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
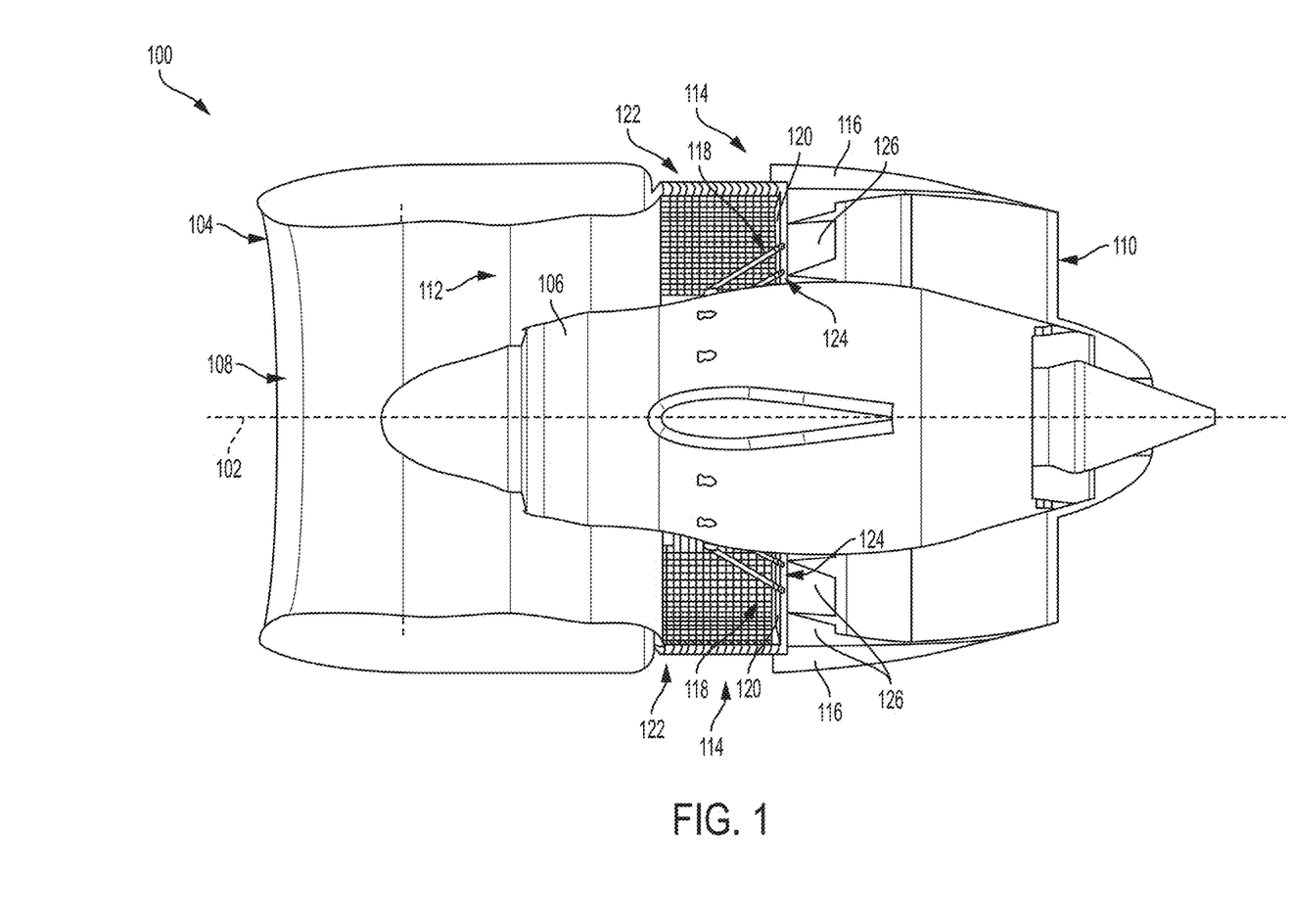
FIG. 1 is a partial cross-sectional view of the nacelle system including a thrust reverser according to a non-limiting embodiment.
Figure 2:
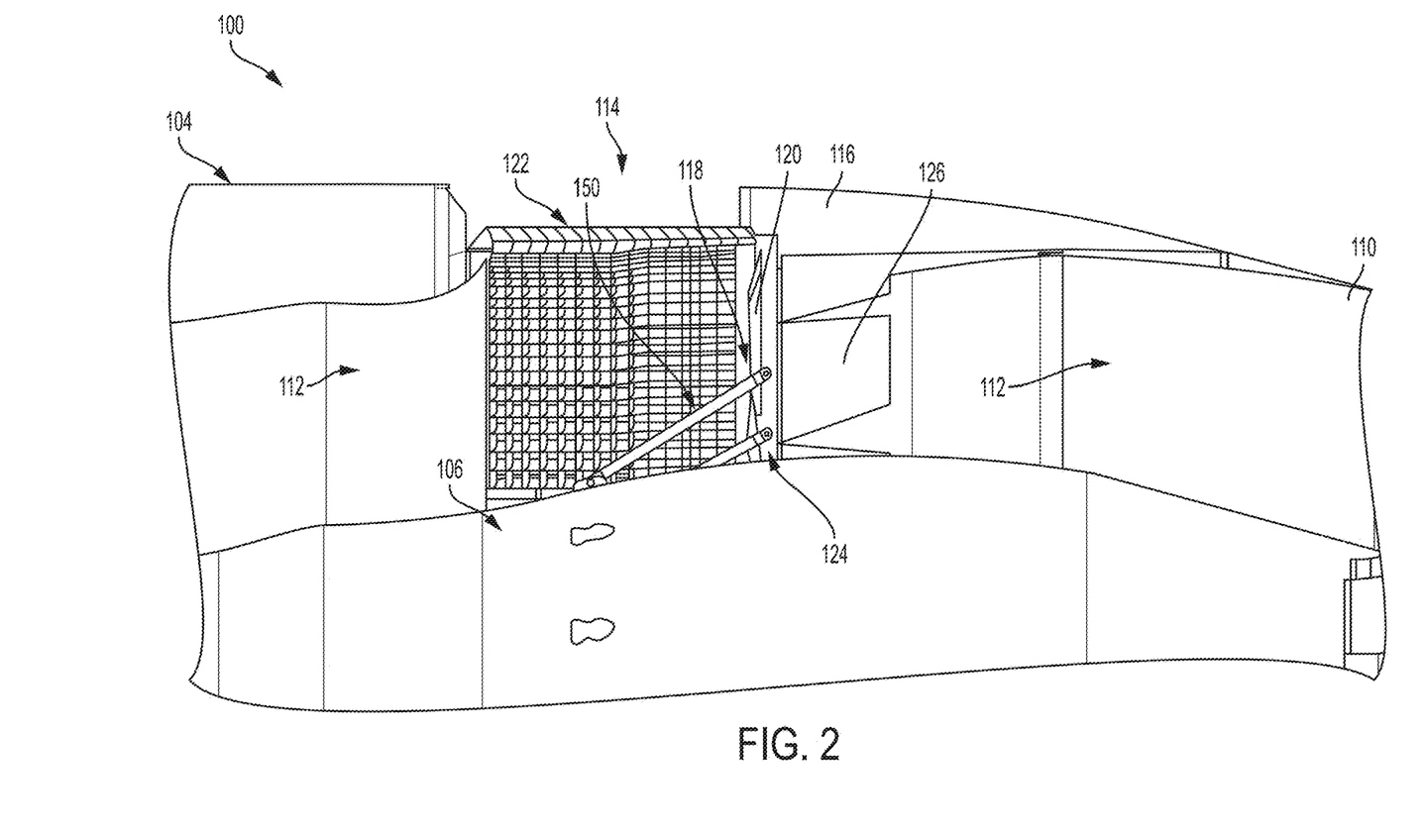
FIG. 2 is close-up view of a portion of FIG. 1.

With reference now to FIGS. 1 and 2, a propulsion system 100, e.g., a propulsion engine, is illustrated extending along and is arranged around a longitudinal axis or rotational axis 102. The propulsion system 100 includes an annular outer nacelle structure 104 that surrounds an inner fixed structure (IFS) 106. The annular outer nacelle structure 104 includes an upstream portion defining an inlet 108 and a downstream portion helping to define a fan nozzle exit 110. A space between the inner surface of the annular outer nacelle structure 104 and the IFS 106 defines an annular flow path or the fan duct 112. The fan duct 112 extends along the longitudinal axis 102 from the inlet 108 to the fan nozzle exit 110. In this manner, airflow entering the inlet 108 may travel along the fan duct 112 and be exhausted at fan nozzle exit 110 to produce forward thrust.

The annular outer nacelle structure 104 further includes a thrust reverser 114. The thrust reverser 114 includes a translating sleeve 116, a blocker door assembly 118 having a plurality of blocker doors 120, and a cascade assembly 122. The translating sleeve 116 slides forward and aftward in the direction of the longitudinal axis 102 so as to mechanically operate the thrust reverser 114 as discussed in greater detail below.

The blocker doors 120 are positionable between a deployed state (shown in FIG. 2) and a stowed state. To transition the blocker doors 120 from the stowed state to the deployed state, the translating sleeve 116 translates aftward relative to the fixed portion of the annular outer nacelle structure 104. As the translating sleeve 116 translates aftward, the blocker doors 120 pivot on the translating sleeve 116 until they extend generally radially inwardly from the translating sleeve 116 and are positioned generally normal to the longitudinal axis 102 and block the fan duct 112. A plurality of nacelle drag-link assemblies 150 are linked to the blocker doors 120 and the IFS 106 to help create this pivoting motion. In addition, when the translating sleeve 116 translates aftward the cascade assemblies 122 are uncovered such that the vents provide a path for airflow to exit the fan duct 112 as understood by one of ordinary skill in the art. While the blocker doors 120 are deployed, a majority of airflow (AF) in the fan duct 112 is diverted radially with respect to the longitudinal axis 102 and is exhausted from the fan duct 112 via the exposed cascade assembly 122. A portion of the airflow, however, is allowed to flow through one or more air leakage paths 124 defined by the blocker doors 120 and the fan duct cross-section. In this manner, a reverse thrust is produced and controlled in a manner so as to decelerate the aircraft.

To transition the blocker doors 120 from the deployed state to the stowed state (not shown), the translating sleeve 116 translates forward relative to the fixed portion of the annular outer nacelle structure 104. As the translating sleeve 116 translates forward, the blocker doors 120 pivot on the translating sleeve 116 until the blocker doors 120 are retracted into respective recesses 126 formed in the inner surface of the translating sleeve 116. In addition, the cascade assemblies 122 are covered so as to prevent airflow from exhausting therethrough. In this position, essentially the full airflow in the fan duct 112 is directed past the blocker door assembly 118 and through the fan duct 112 where it is exhausted from the fan nozzle exit 110 to promote forward thrust of the aircraft.

Figure 3:
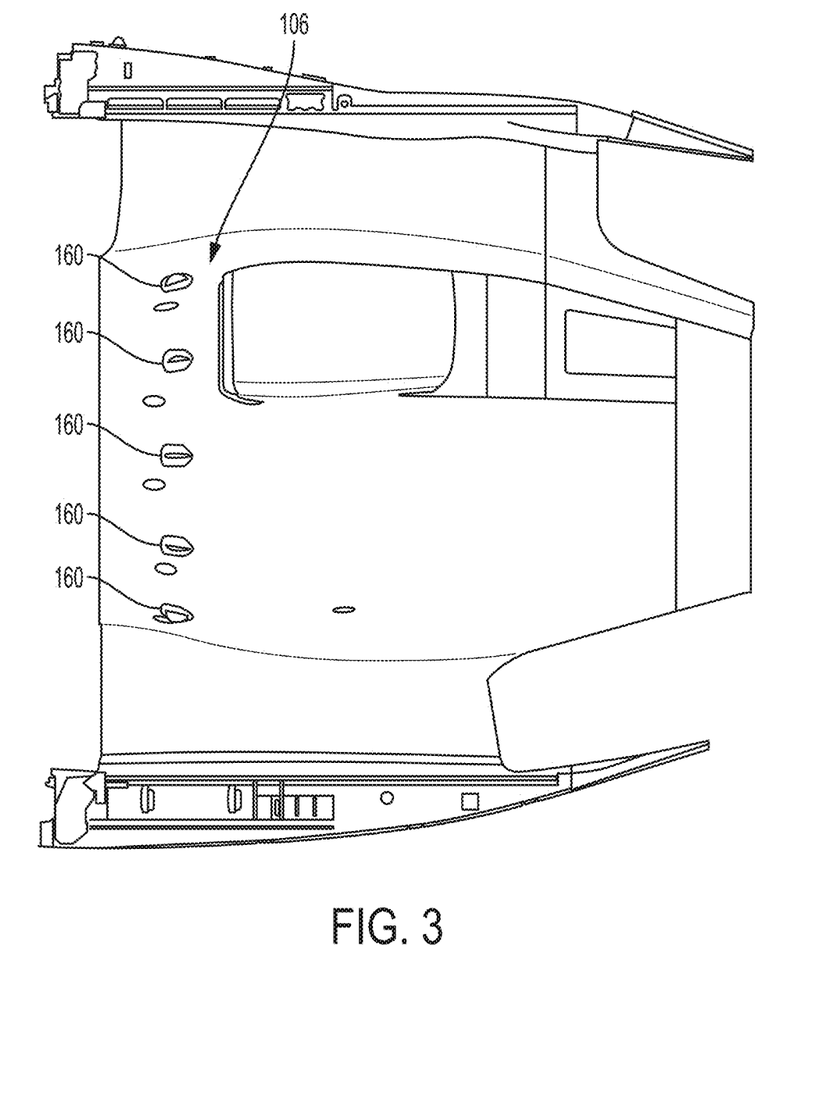
FIG. 3 is a side view of drag-link fittings on an inner fixed structure according to a non-limiting embodiment.

Turning to FIG. 3 a view of drag-link fittings 160 on IFS 106 are depicted according to a non-limiting embodiment. In the example of FIG. 3, there are five drag-link fittings 160 depicted, while another five drag-link fittings 160 can be arranged on an opposite IFS 106 (each IFS 106 may constitute one half of a clam-shell type structure which together surround the engine and form the duct bifrucations, as known to those skilled in this art). Each of the drag-link fittings 160 forms a portion of the each of the nacelle drag-link assemblies 150 of FIG. 2.

Figure 4:
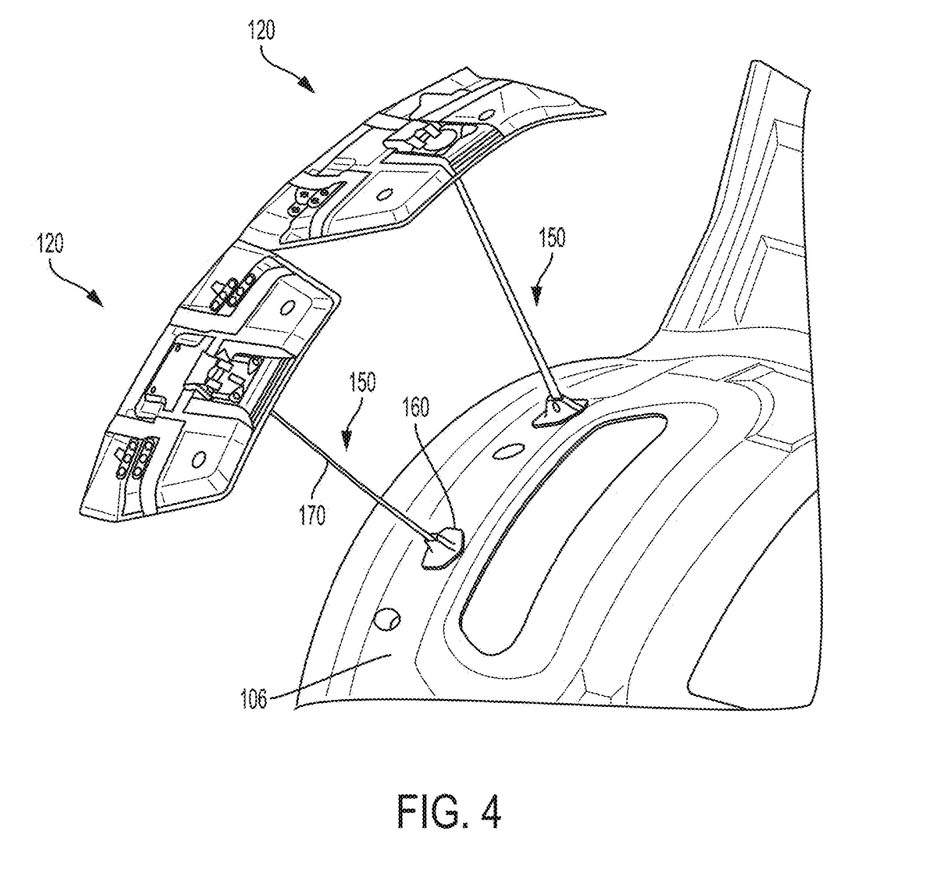
FIG. 4 is a perspective view of multiple nacelle drag-link assemblies coupled to blocker doors and an inner fixed structure according to a non-limiting embodiment.
Figure 5:
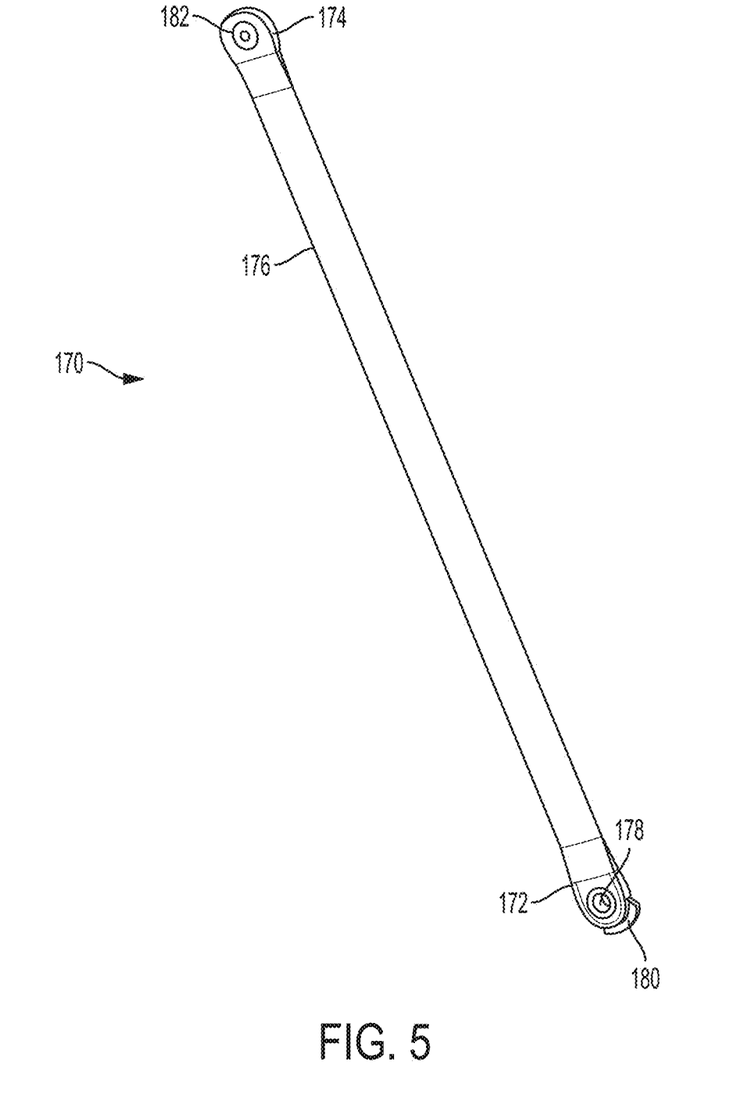
FIG. 5 is a perspective view of a drag link according to a non-limiting embodiment.

FIG. 4 is a perspective view of multiple nacelle drag-link assemblies 150 coupled to blocker doors 120 and IFS 106 according to a non-limiting embodiment. Each of the nacelle drag-link assemblies 150 includes a drag link 170 coupled to a drag-link fitting 160. As depicted in FIG. 5, each drag link 170 includes an inner structure end 172, an outer structure end 174, and a link body 176 formed between the inner structure end 172 and the outer structure end 174. In an embodiment, the drag link 170 is formed of aluminum and has a slenderness ratio of about one hundred. The slenderness ratio is a ratio of the length of a structural member to the smallest radius of gyration of its cross section and may be used in buckling and vibration analyses. The inner structure end 172 includes an aperture 178 to support coupling with one of the drag-link fittings 160 of FIG. 4. The inner structure end 172 may also include a tab 180. The outer structure end 174 has a pivot area 182 to link with a blocker door 120 of the thrust reverser 114 of FIG. 1. The outer structure end 174 may be pivotally mounted to the blocker door via a spherical bearing, the bearing engaging the pivot area 182. The spherical bearing may be mounted on a spring mechanism of the blocker door such that the bearing is biased toward the drag link 170 when the drag link is in its stowed position, and the bearing applies a compressive force to the drag link in this position, as is known to those of skill in this art.

The foregoing description of an exemplary thrust reverser is provided as one example of how a drag link may be used in such a system. Drag links may be used in thrust reversers with different designs than the one previously described, and the following description of how vibrations of the link may be damped are equally applicable to those other designs and other drag links, as will be understood by those of skill in this art.

Figure 6:
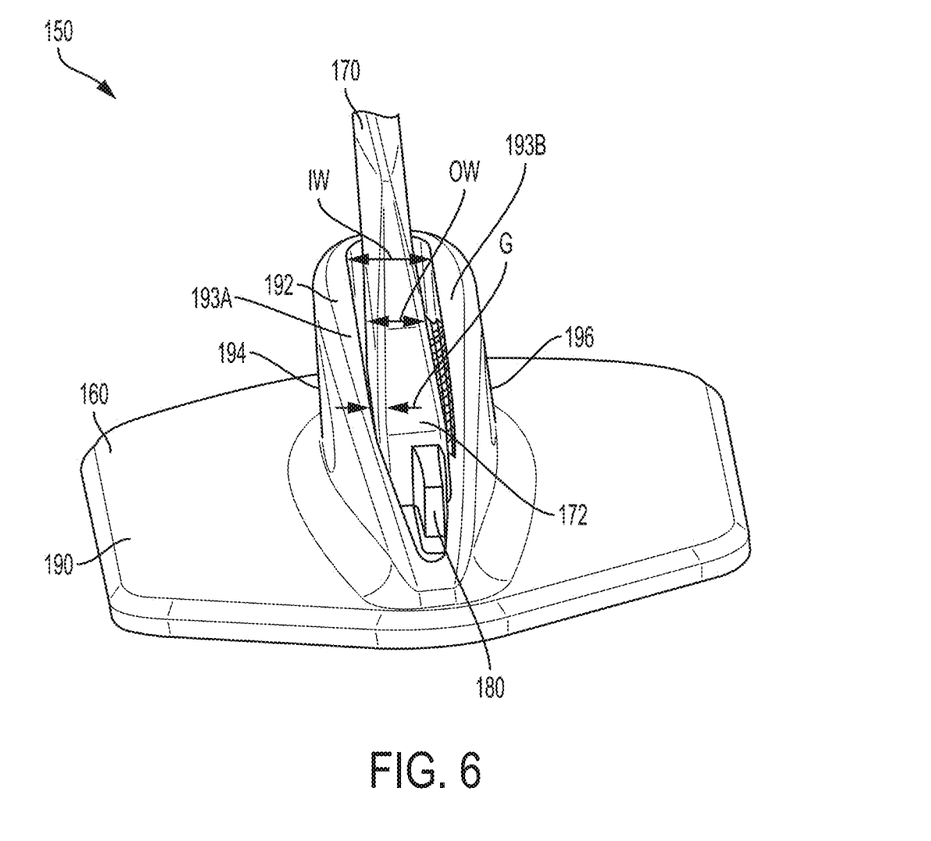
FIG. 6 is a perspective view of a portion of a nacelle drag-link assembly according to a non-limiting embodiment.

FIG. 6 is a perspective view of a portion of a nacelle drag-link assembly 150 according to a non-limiting embodiment, including a drag-link fitting 160 and drag link 170. The drag-link fitting 160 includes a base region 190 and a coupling socket 192 extending from the base region 190. The coupling socket 192 has a first coupling aperture 194 formed in a first upstanding segment 193A and a second coupling aperture 196 formed in a second upstanding segment 193B. As can be seen in FIG. 6, an inner width (IW) of the coupling socket 192 is greater than an outer width (OW) of the inner structure end 172 of the drag link 170 such that a gap (G) is formed between the coupling socket 192 and the inner structure end 172. To increase fixity, e.g., remove tolerance effects and free play, and bump resonance of the drag link 170 above a typical engine operating range while also reducing bending stresses on the drag link 170, a vibration damping assembly can be incorporated into the nacelle drag-link assembly 150.

Figure 7:
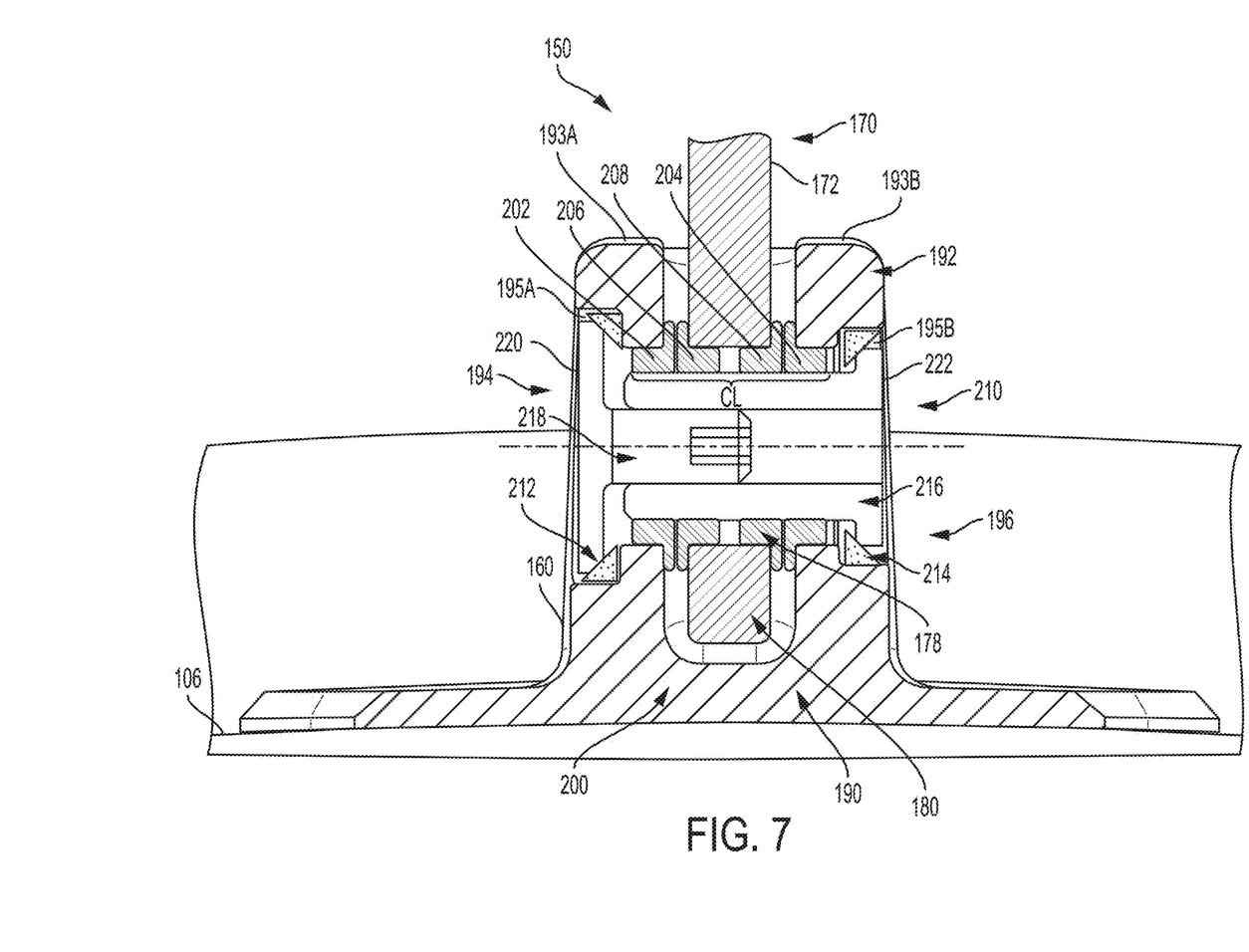
FIG. 7 is a cross-sectional view of a portion of a vibration damping assembly of a nacelle drag-link assembly according to a non-limiting embodiment.

FIG. 7 is a cross-sectional view of a portion of a vibration damping assembly 200 of nacelle drag-link assembly 150 according to a non-limiting embodiment. A first flanged bushing 202, a second flanged bushing 204, a third flanged bushing 206, and a fourth flanged bushing 208 are depicted in FIG. 7. The first flanged bushing 202 can be installed (e.g., press fit) within the first coupling aperture 194 of FIG. 6. The second flanged bushing 204 can be installed (e.g., press fit) within the second coupling aperture 196 of FIG. 6. The third and fourth flanged bushings 206 and 208 can be installed (e.g., press fit) in the aperture 178 of the inner structure end 172 of drag link 170. A coupling assembly 210 passes through the first, second, third, and fourth flanged bushings 202-208. In the example of FIG. 7, a coupling length (CL) can be defined between outermost surfaces of the first and second flanged bushings 202, 204, where the coupling length (CL) is greater than the inner width (IW) of the coupling socket 192. A flanged surface of the first flanged bushing 202 is arranged proximate to a flanged surface of the third flanged bushing 206, and a flanged surface of the second flanged bushing 204 is arranged proximate to a flanged surface of the fourth flanged bushing 208.

The vibration damping assembly 200 can include a first compliant member 212 and a second compliant member 214. The first and second compliant members 212 and 214 may be formed as a boot or washer with respect to elements of the coupling assembly 210 of FIG. 7. The first and second compliant members 212 and 214 may have a triangular cross section to take advantage of the radial and axial constraint that allows bolt 218 and threaded cap 216 to float with respect to the drag-link fitting 160. The triangular cross section also takes advantage of the shear damping characteristics of the silicone rubber material. The coupling assembly 210 can include a threaded cap 216 installed in contact with the first, second, third, and fourth flanged bushings 202-208. The coupling assembly 210 can also include a bolt 218 installed within the threaded cap 216. A bolt head 220 of the bolt 218 is fitted in a first counterbore 195A of the first coupling aperture 194, and a cap head 222 of the threaded cap 216 is fitted in a second counterbore 195B of the second coupling aperture 196. The first compliant member 212 can be placed in contact with each of and positioned between the bolt head 220 and the coupling socket 192 in the first counterbore 195A of the first upstanding segment 193A, and the second compliant member 214 can be placed in contact with each of and positioned between the cap head 222 and the coupling socket 192 in the second counterbore 195B of the second upstanding segment 193B.

Figure 8:
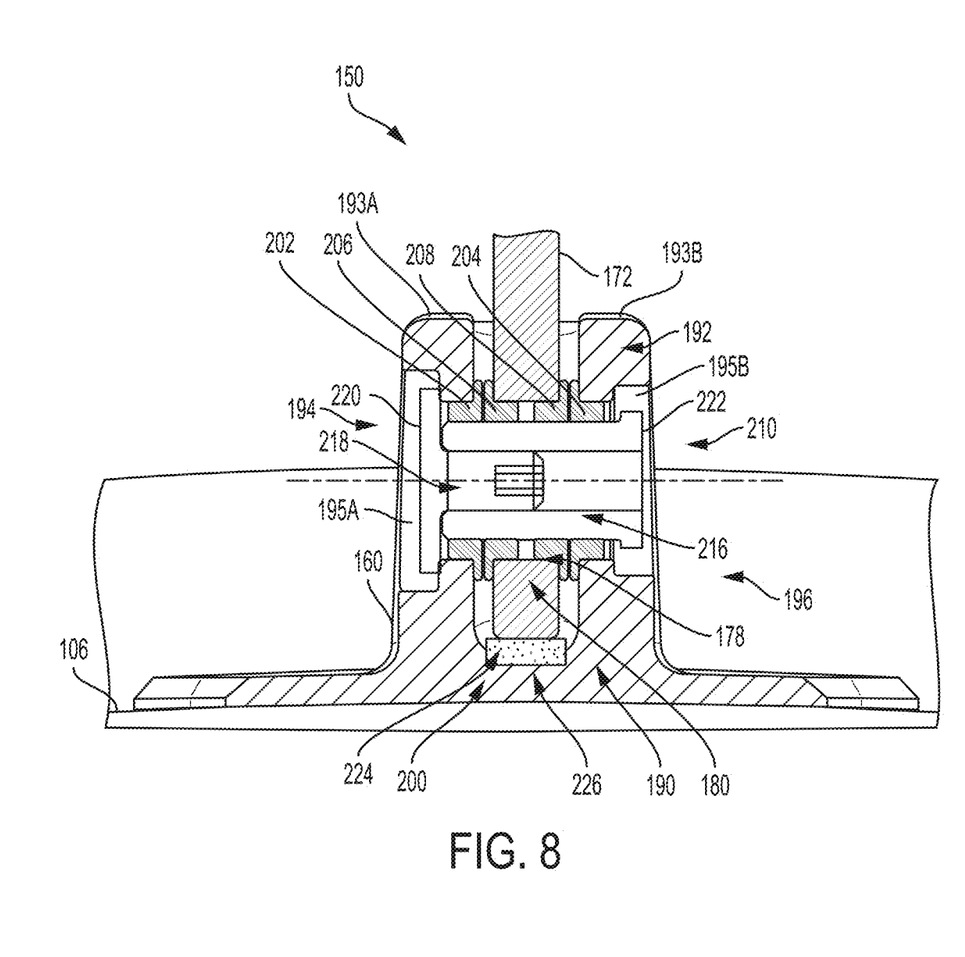
FIG. 8 is a cross-sectional view of a portion of a nacelle drag-link assembly according to a non-limiting embodiment.

In addition to the first compliant member 212 and the second compliant member 214, or as an alternative, the vibration damping assembly 200 can include a compliant rub strip 224 installed between the inner structure end 172 and the coupling socket 192 as depicted in FIG. 8. The tab 180 can be positioned to contact the compliant rub strip 224 when the thrust reverser 114 of FIG. 1 is fully opened and/or fully closed. The first compliant member 212, second compliant member 214, and/or compliant rub strip 224 can be formed from a compound of silicone rubber. The compound can be optimized to balance stiffness and damping characteristics. The compliant rub strip 224 may be installed in a groove 226 formed in the base region 190 which is sized to receive the tab 180. Although separately depicted in FIGS. 7 and 8, it will be understood that embodiments can include a combination of the first compliant member 212, second compliant member 214, and/or compliant rub strip 224.

The above described compliant members 212, 214, and 224 each constitute an example of including a compliant, vibration damping member in the load path between the drag link 170 and the drag link fitting 160. Vibrations induced in the drag link 170 will transfer loads to the drag link fitting 160, either directly or through bushings and a pin like coupling assembly 210. Having a vibration damping member in this load path will help damp the vibrations and/or change the natural frequencies of the drag link in order to avoid any damaging resonant vibrations.

With respect to FIGS. 1-8, a method of installing a nacelle drag-link assembly 150 in a propulsion system 100 includes aligning an inner structure end 172 of a drag link 170 of the nacelle drag-link assembly 150 with a coupling socket 192 extending from a base region 190 of a drag-link fitting 160 of the nacelle drag-link assembly 150. The drag link 170 includes the inner structure end 172, an outer structure end 174, and a link body 176 formed between the inner structure end 172 and the outer structure end 174. An inner width (IW) of the coupling socket 192 is greater than an outer width (OW) of the inner structure end 172 of the drag link 170. A coupling assembly 210 is installed through an aperture 178 of the inner structure end 172 and between a first coupling aperture 194 and a second coupling aperture 196 of the coupling socket 192. A vibration damping assembly 200 is installed in contact with the drag-link fitting 160 and one or more of: the drag link 170 and the coupling assembly 210. A pivot area 182 of the outer structure end 174 is linked to a blocker door 120 of a thrust reverser 114 of the propulsion system 100.

Installing the coupling assembly 210 can include passing the coupling assembly 210 through: a first flanged bushing 202 installed within the first coupling aperture 194, a second flanged bushing 204 installed within the second coupling aperture 196, a third flanged bushing 206 installed within the aperture 178 of the inner structure end 172, and a fourth flanged bushing 208 installed within the aperture 178 of the inner structure end 172. Installing the coupling assembly 210 can also include installing a threaded cap 216 in contact first, second, third, and fourth flanged bushings 202-208, and installing a bolt 218 within the threaded cap 216. Upon installing the threaded cap 216 and the bolt 218, a bolt head 220 of the bolt 218 extends into the first coupling aperture 194, and a cap head 222 of the threaded cap 216 extends into the second coupling aperture 196.

Installing the vibration damping assembly 200 can include placing a first compliant member 212 in contact with the bolt head 220 and a second compliant member 214 in contact with the cap head 222. Installing the vibration damping assembly 200 can also or alternatively include installing a compliant rub strip 224 between the inner structure end 172 and the coupling socket 192. Aligning the inner structure end 172 with the coupling socket 192 can include positioning a tab 180 of the inner structure end 172 to contact the compliant rub strip 224 when the thrust reverser 114 is fully opened and fully closed.

The terminology used herein is for the purpose of describing particular embodiments only and is not intended to be limiting. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

We claim:

1. A nacelle drag-link assembly for a thrust reverser of a propulsion system, the nacelle drag-link assembly comprising:
   a drag-link fitting comprising a base region and a coupling socket extending from the base region, the coupling socket having a first coupling aperture and a second coupling aperture;
   a first flanged bushing installed within the first coupling aperture;
   a second flanged bushing installed within the second coupling aperture;
   a drag link comprising an inner structure end, an outer structure end, and a link body formed between the inner structure end and the outer structure end, wherein an inner width of the coupling socket is greater than an outer width of the inner structure end of the drag link, and the outer structure end comprises a pivot area to link with a blocker door of the thrust reverser;
   a third flanged bushing installed within an aperture of the inner structure end;
   a fourth flanged bushing installed within the aperture of the inner structure end;
   a coupling assembly installed through an aperture of the inner structure end and between the first coupling aperture and the second coupling aperture of the coupling socket, wherein the coupling assembly passes through the first, second, third, and fourth flanged bushings; and
   a vibration damping assembly installed in contact with the drag-link fitting and one or more of: the drag link and the coupling assembly.

2. The nacelle drag-link assembly of claim 1, wherein the coupling assembly comprises:
   a threaded cap installed in contact with the first, second, third, and fourth flanged bushings; and
   a bolt installed within the threaded cap.

3. The nacelle drag-link assembly of claim 2, wherein a bolt head of the bolt extends into the first coupling aperture and a cap head of the threaded cap extends into the second coupling aperture.

4. The nacelle drag-link assembly of claim 3, wherein the vibration damping assembly comprises a first compliant member in contact with the bolt head and a second compliant member in contact with the cap head.

5. The nacelle drag-link assembly of claim 4, wherein the vibration damping assembly comprises a compliant rub strip installed between the inner structure end and the coupling socket.

6. The nacelle drag-link assembly of claim 1, wherein the vibration damping assembly comprises a compliant rub strip installed between the inner structure end and the coupling socket.

7. The nacelle drag-link assembly of claim 6, wherein the inner structure end further comprises a tab positioned to contact the compliant rub strip when the thrust reverser is fully opened and/or fully closed.

8. The nacelle drag-link assembly of claim 1, wherein the vibration damping assembly is formed from silicone rubber.

9. The nacelle drag-link assembly of claim 1, wherein the vibration damping assembly comprises one or more of: a washer, a boot, and a rub strip.

10. The nacelle drag-link assembly of claim 9, wherein the vibration damping assembly has a triangular cross section.

11. A method of damping vibrations in a drag link, the method comprising:
pivotally coupling a drag link at a first end to a movable blocker door of a thrust reverser, wherein the drag link comprises an inner structure end, an outer structure end, and a link body formed between the inner structure end and the outer structure end, wherein an inner width of the coupling socket is greater than an outer width of the inner structure end of the drag link;
pivotally coupling a second end of the drag link opposite the first end to a drag link fitting attached to an inner fixed structure that surrounds a propulsion engine, wherein the drag link fitting comprises a base region and a coupling socket extending from the base region, the coupling socket having a first coupling aperture and a second coupling aperture, a first flanged bushing is installed within the first coupling aperture, a second flanged bushing is installed within the second coupling aperture, a third flanged bushing is installed within an aperture of the inner structure end, and a fourth flanged bushing installed within the aperture of the inner structure end; and
establishing a load path between the drag link and the drag link fitting that includes therein a compliant, vibration damping component to damp vibrations between the drag link fitting and the drag link.

12. A nacelle drag-link assembly for a thrust reverser of a propulsion system, the nacelle drag-link assembly comprising:
a drag-link fitting comprising a base region and a coupling socket extending from the base region, the coupling socket having a first coupling aperture and a second coupling aperture;
a drag link comprising an inner structure end, an outer structure end, and a link body formed between the inner structure end and the outer structure end, wherein an inner width of the coupling socket is greater than an outer width of the inner structure end of the drag link, and the outer structure end comprises a pivot area to link with a blocker door of the thrust reverser;
a coupling assembly installed through an aperture of the inner structure end and between the first coupling aperture and the second coupling aperture of the coupling socket; and
a vibration damping assembly installed in contact with the drag-link fitting and one or more of: the drag link and the coupling assembly, wherein the vibration damping assembly comprises a compliant rub strip installed between the inner structure end and the coupling socket.

13. The nacelle drag-link assembly of claim 12, wherein the inner structure end further comprises a tab positioned to contact the compliant rub strip when the thrust reverser is fully opened and/or fully closed.

* * * * *